C. A. CLARK.
SKID.
APPLICATION FILED APR. 5, 1916.
1,194,819.
Patented Aug. 15, 1916.
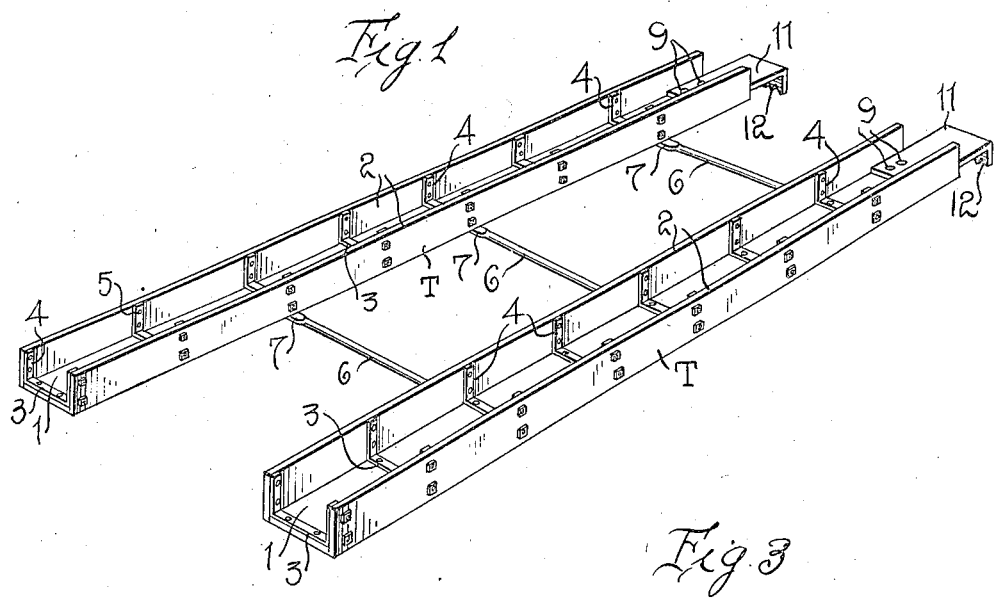
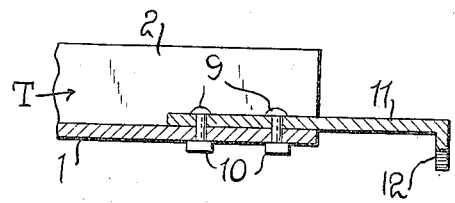
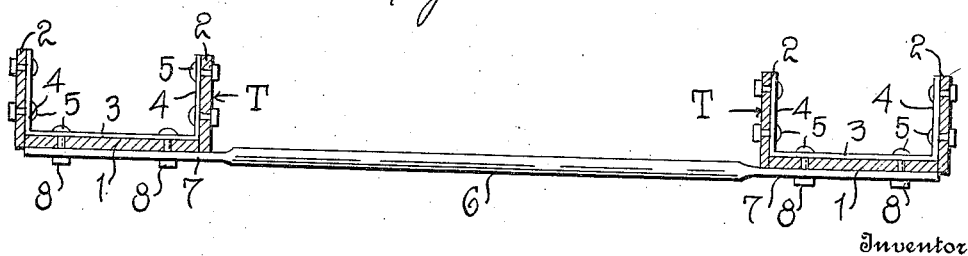
Inventor
CHARLES A. CLARK
By Watson E. Coleman
Attorney

UNITED STATES PATENT OFFICE.

CHARLES A. CLARK, OF BUFFALO CENTER, IOWA.

SKID.

1,194,819.      Specification of Letters Patent.      Patented Aug. 15, 1916.

Application filed April 5, 1916. Serial No. 89,244.

*To all whom it may concern:*

Be it known that I, CHARLES A. CLARK, a citizen of the United States, residing at Buffalo Center, in the county of Winnebago and State of Iowa, have invented certain new and useful Improvements in Skids, of which the following is a specification, reference being had to the accompanying drawings.

This invention relates to certain improvements in skids and has relation more particularly to a device of this general character of a portable type, and it is an object of the invention to provide a novel and improved skid which may be employed with convenience and facility especially in connection with wheeled supported bodies such as automobiles.

The invention consists in the details of construction and in the combination and arrangement of the several parts of my improved skid whereby certain important advantages are attained and the device is rendered simpler, less expensive, and otherwise more convenient and advantageous for use all as will be hereinafter more fully set forth.

The novel features of the invention will be hereinafter definitely claimed.

In order that my invention may be better understood, I will now proceed to describe the same with reference to the accompanying drawings, wherein:

Figure 1 is a view in perspective of a skid constructed in accordance with an embodiment of my invention; Fig. 2 is a transverse sectional view taken through the device as herein disclosed; and Fig. 3 is a fragmentary longitudinal sectional view taken through the upper end of one of the trackways as herein set forth.

As disclosed in the accompanying drawings T—T denote two track ways comprised in my improved skid and arranged substantially in parallelism, and each of said track ways T as herein embodied comprises an elongated base member of pre-determined length and width and provided with the upstanding longitudinal marginal flanges 2 extending the entire length thereof and of a pre-determined height. Disposed transversely of the bottom 1 in pre-determined longitudinal spaced relation are the irons 3 having their opposite extremities upturned as at 4 whereby said irons may be effectively secured to the bottom 1 and the sides 2 through the medium of the bolts 5. In addition to reinforcing the assemblage of the bottom 1, and sides 2, the irons 3 afford means whereby a wheeled body such as an automobile may be caused to travel with a maximum of facility upon the track ways T when in an inclined position.

The track ways T are maintained in pre-determined spaced relation through the medium of the tie rods 6 which have their opposite end portions flattened as at 7 said end portions 7 underlying the bottoms 1 and secured thereto through the medium of certain of the bolts 5, said bolts being elongated to facilitate their use for this purpose. It is to be noted that the nuts 8 coacting with the bolts 5 are positioned beneath the bottoms 1.

The upper ends of the bottoms 1 have secured thereto through the medium of the bolts 9 and the coacting nuts 10, the plates 11 which extend upon the adjacent ends of the bottoms and have their extended portions angularly arranged and terminating in the teeth 12, whereby it will be perceived that the plates 10 will serve as an effective medium for maintaining the skid in applied position especially when employed in connection with a railway car. The plate 10 is adapted to overlie the cross piece or skid of a car opening, and the teeth 12 are adapted to penetrate the inner face of said cross piece or sill as believed to be clearly understood by those skilled in the art to which my invention appertains.

From the foregoing description it is thought to be obvious that a skid constructed in accordance with my invention is of an extremely simple and comparatively inexpensive nature, and is particularly well adapted for use by reason of the convenience and facility with which it may be assembled, and it will also be obvious that my invention is susceptible of some change and modification without material departure from the principle and spirit thereof, and for this reason I do not wish to be understood as limiting myself to the precise arrangement and formation of the several parts herein shown in carrying out my invention in practice except as hereinafter more definitely claimed.

Having described my invention what I claim is:

A skid comprising parallel track ways having upstanding longitudinal marginal flanges extending substantially the entire length thereof and tie rods interposed between the track ways and serving to maintain the same in pre-determined spaced relation, the extremities of said rods underlying the track ways, and U-shaped arms arranged within the track ways and spaced longitudinally thereof, and means for securing said arms to the track way, certain of said means serving to anchor the connecting rods to the track ways.

In testimony whereof I hereunto affix my signature in the presence of two witnesses.

CHARLES A. CLARK.

Witnesses:
C. A. BARBER,
E. E. SAPY.